(12) United States Patent
Carlsson et al.

(10) Patent No.: US 11,731,248 B2
(45) Date of Patent: Aug. 22, 2023

(54) POWER TOOL ATTACHMENT PART

(71) Applicant: ATLAS COPCO INDUSTRIAL TECHNIQUE AB, Stockholm (SE)

(72) Inventors: Nils David Gustav Carlsson, Trosa (SE); Per Ingemar Forsberg, Värmdö (SE); Alexander Reza Niawik, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 43 days.

(21) Appl. No.: 17/387,482

(22) Filed: Jul. 28, 2021

(65) Prior Publication Data

US 2021/0362304 A1 Nov. 25, 2021

Related U.S. Application Data

(63) Continuation of application No. 14/648,953, filed as application No. PCT/EP2013/076221 on Dec. 11, 2013, now abandoned.

(30) Foreign Application Priority Data

Dec. 21, 2012 (SE) .................................... 1251508-6

(51) Int. Cl.
  *B25B 13/48* (2006.01)
  *F16H 57/021* (2012.01)
  *B25B 17/00* (2006.01)

(52) U.S. Cl.
  CPC ............ *B25B 13/481* (2013.01); *B25B 17/00* (2013.01); *F16H 57/021* (2013.01)

(58) Field of Classification Search
  CPC ...... B25B 13/467; B25B 13/481; B25B 17/00

USPC ......................................................... 81/57.3
See application file for complete search history.

(56) References Cited

U.S. PATENT DOCUMENTS

| | | |
|---|---|---|
| 765,785 A | 7/1904 | Nelson |
| 1,327,991 A | 1/1920 | Gatewood |
| 1,423,142 A | 7/1922 | Owens |
| 3,369,421 A | 2/1968 | Stanford et al. |
| 3,987,691 A | 10/1976 | Savage |
| 3,987,692 A | 10/1976 | Lesner et al. |

(Continued)

FOREIGN PATENT DOCUMENTS

| | | |
|---|---|---|
| DE | 9103252 U1 | 7/1992 |
| DE | 202011002965 U1 | 6/2011 |

(Continued)

OTHER PUBLICATIONS

International Search Report (ISR) dated Feb. 21, 2014 issued in International Application No. PCT/EP2013/076221.

*Primary Examiner* — Joel D Crandall
(74) *Attorney, Agent, or Firm* — Holtz, Holtz & Volek PC

(57) ABSTRACT

An attachment part for tightening joints includes an elongate housing including an upper housing part and a lower housing part, an input gear wheel for connection to an output shaft of a power wrench, arranged at a first end of the housing, an output gear wheel for connection to a joint to be tightened, arranged at a second end of the housing, and at least one intermediate gear wheel arranged inside the housing to transmit rotation of the input gear wheel to the output gear wheel, wherein each gear wheel has outer slanted teeth that connect the gear wheels and transmit said rotation there between.

8 Claims, 6 Drawing Sheets

(56) References Cited

U.S. PATENT DOCUMENTS

| | | | | |
|---|---|---|---|---|
| 4,063,475 | A | * | 12/1977 | Perkins .................. B25B 17/00 |
| | | | | 81/57.3 |
| 4,287,795 | A | | 9/1981 | Curtiss |
| 4,735,118 | A | | 4/1988 | Broemel |
| 4,827,810 | A | | 5/1989 | Rushanan |
| 5,226,906 | A | | 7/1993 | Crombie et al. |
| 5,339,710 | A | * | 8/1994 | Deadmond ............ B25B 17/00 |
| | | | | 81/57.3 |
| 5,355,751 | A | * | 10/1994 | Specht .................. B25B 23/147 |
| | | | | 81/57.3 |
| 5,732,605 | A | | 3/1998 | Mann |
| 5,911,437 | A | * | 6/1999 | Lawrence ................ B60S 9/04 |
| | | | | 254/419 |
| 6,050,741 | A | * | 4/2000 | Aultman ............... B24B 45/006 |
| | | | | 403/374.1 |
| 7,287,885 | B2 | | 10/2007 | Radu et al. |
| 7,963,346 | B2 | | 6/2011 | Brodin |
| 8,590,401 | B2 | | 11/2013 | Conquergood et al. |

FOREIGN PATENT DOCUMENTS

| | | |
|---|---|---|
| GB | 2253803 A | 9/1992 |
| WO | 2012098814 A1 | 7/2012 |

* cited by examiner

POWER TOOL ATTACHMENT PART

CROSS-REFERENCE TO RELATED APPLICATION

This application is a Continuation Application of U.S. application Ser. No. 14/648,953, filed on Jun. 2, 2015, which is a National Stage Application of International Application No. PCT/EP2013/076221, filed on Dec. 11, 2013, which is based upon and claims the benefit of Swedish Patent Application No. 1251508-6, filed on Dec. 21, 2012.

TECHNICAL FIELD

The invention relates to an attachment part for providing a torque from a torque wrench to a joint.

A power wrench attachment part is generally used in confined spaces where it is not possible to use an ordinary power wrench, due to that it is difficult to access the bolt or nut of the joint to be screwed. An attachment part is also known as a crowfoot, a front part attachment or an offset attachment. Below it will be referred to as an attachment part.

BACKGROUND

An attachment part includes a number of gear wheels that transmit a rotating movement from an input gear wheel to an output gear wheel. The gear wheels are generally located in a straight row, teeth against teeth, inside an elongate housing. In addition to the thickness of the housing wall the length of the attachment part corresponds to the sum of the width of the gear wheels. The width of the attachment part corresponds to the housing wall and the width of one gear wheel, and the height of the attachment part corresponds to the housing wall and the height of one gear wheel plus the height of the bearing arrangement, which is conventionally located between the gear wheels and the housing.

As is indicated above an attachment part is generally used in confined spaces. Therefore, the size of it is an important feature. Further, the efficiency and accuracy of the attachment part is dependent on the height of the gear wheels, i.e. the length of the teeth engagement. The use of gear wheels with slanted teeth increases the length of the teeth engagement, and hence both the efficiency and the accuracy of the attachment part. This implies that an attachment part with slanted teeth may be utilised at higher torques, and at the same time provide a more reliable torque. On the other hand, the use of gear wheels with slanted teeth will give rise to axial forces, which will act to tilt the gear wheels and create tensions in the attachment part.

Therefore, slanted gear wheels are supported in a manner that restricts their ability to tilt. Conventionally slanted gear wheels are arranged on a central shaft that is supported by both radial bearings and axial bearings. A disadvantage of this conventional arrangement is that the bearings build on the width of the attachment part. Further, the rigid arrangement of the gear wheels will give rise to tensions which may lead to fatigue and ruptures in the material.

Hence, there is a need of an attachment part that has both a high efficiency and a high accuracy.

SUMMARY OF THE INVENTION

An object of the invention is to provide an attachment part with a compact design and with a relatively high efficiency and accuracy.

According to one embodiment, attachment part for tightening joints includes: an elongate housing including an upper housing part and an interconnected lower housing part, an input gear wheel for connection to an output shaft of a power wrench, which input gear wheel is arranged at a first end of the housing, an output gear wheel for connection to a joint to be tightened, which output gear wheel is arranged at a second end of the housing, and at least one intermediate gear wheel, which is arranged inside the housing to transmit the rotation of the input gear wheel to the output gear wheel, wherein each gear wheel has outer slanted teeth that connect the gear wheels and transmit said rotation there between. Further, the at least one intermediate gear wheel includes: an upper race, which is arranged inside the at least one intermediate gear wheel and faces the upper housing part, wherein balls are arranged in said upper race at least partly inside the at least one intermediate gear wheel to support an upper part of it with respect to the housing, and a lower race, which is arranged inside the at least one intermediate gear wheel and faces the lower housing part, wherein balls are arranged in said lower race at least partly inside the at least one intermediate gear wheel to support a lower part of it with respect to the housing.

In one specific embodiment of the invention the upper and lower races are arranged at a position inside the at least one intermediate gear wheel that allows the whole of the balls to fit inside the at least one intermediate gear wheel.

In another embodiment of the invention the balls in the upper and lower races are supported by the respective housing parts via upper and lower axial supports, respectively, which include an flex portion that allows the at least one intermediate gear wheel to flex with respect to the housing.

In yet another embodiment of the invention the upper and lower axial supports include a body portion that is clamped into through holes in the respective housing part, and a circular flange that is arranged to support said balls, and wherein said circular flange is separated from the body portion via a flex portion, which allows the circular flange to flex with respect to the housing.

The upper and lower axial supports may include an abutment portion arranged to abut the housing.

In another embodiment the balls in the upper and lower races are fully supported by upper and lower axial supports, respectively, which axial supports are connected to each other via an attachment piece that runs through the centre of the intermediate gear wheel, such that an upper and lower axial support, balls, and a gear wheel forms a releasable gear package.

The attachment piece may be a screw wherein one of the axial supports has a threaded opening inside which the tip of the screw is to be screwed.

The upper and lower axial supports may include a body portion that is arranged to be received in through holes in the upper and lower housing part, respectively.

In one specific embodiment of the invention the output gear wheel is journalled inside the housing, by means of balls that are arranged between the upper and lower outer periphery of the output gear wheel and the respective housing part.

In another embodiment of the invention the attachment part includes at least two intermediate gear wheels, or even three intermediate gear wheels.

In yet another embodiment of the invention the housing parts are held together by screws, and wherein there is a gap between the screws and one of the housing parts, such that there is an allowance inside which the housing parts may slide with respect to each other.

Other features and advantages of the invention will be apparent from the figures and from the detailed description of the shown embodiments.

SHORT DESCRIPTION OF THE DRAWINGS

In the following detailed description reference is made to the accompanying drawings, of which:

DETAILED DESCRIPTION OF THE SHOWN EMBODIMENT OF THE INVENTION

Figure 1:
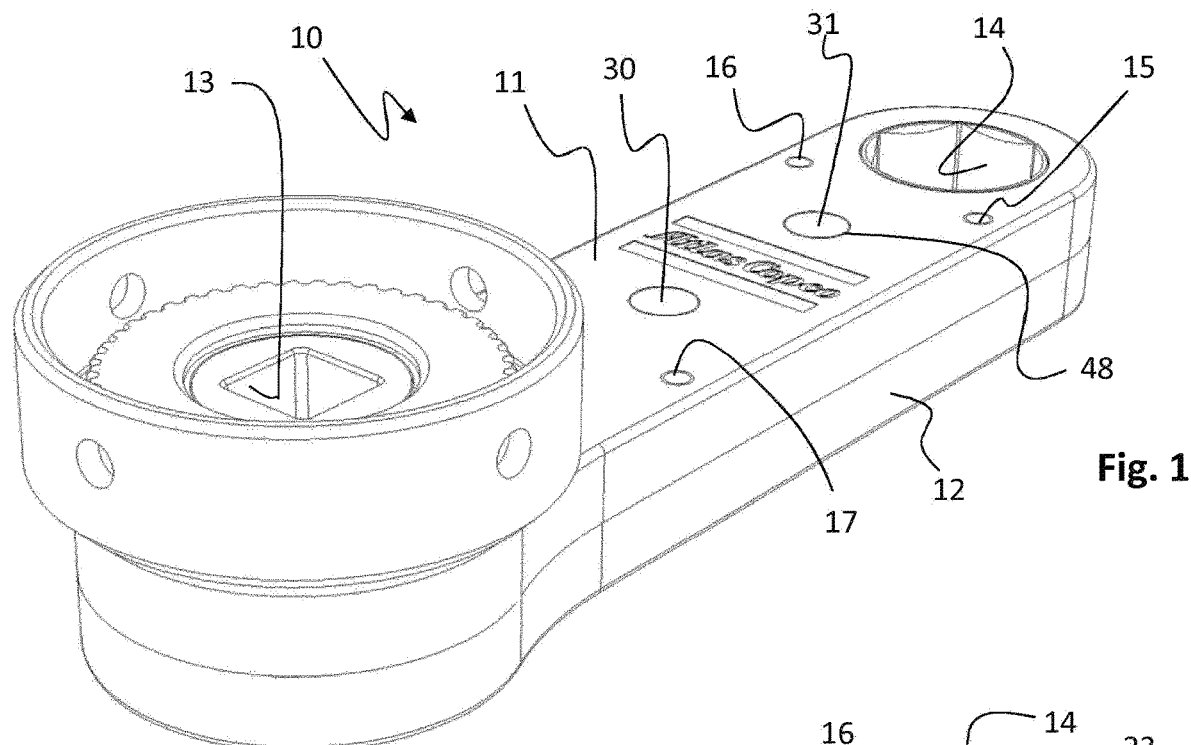
FIG. 1 shows an attachment part according to a specific embodiment of the invention.

In FIG. 1 an attachment part 10 according to a specific embodiment of the invention is shown.

The attachment part 10 comprises an elongate housing 11, 12 comprising an upper housing part 11 and an interconnected lower housing part 12.

An input connector 13 for connection to an output shaft of a power wrench is arranged at a first end of the housing 11, 12, and an output connector 14 for connection to a joint to be tightened is arranged at an opposite second end of the housing. The housing parts 11, 12 are held together by means of a number of screws 15-21. In the shown embodiment, the housing parts 11 and 12 are held together by screws 15-21 only. The use of screws only minimises the risk of creating unwanted tensions in the housing, which may otherwise appear when screws are combined with other attachment devices such as rigid connection pins. Namely, there is a play between the screw holes and the screws in one of the housing parts.

In the shown embodiment the screw holes of the lower housing part 12 include a gap, while the screw holes of the upper housing part 11 are threaded so as to form a joint with the screws 15-21. The gaps make it possible for the housing parts 11 and 12 to move slightly with respect to each other. In FIG. 1 it is visible that the screws 15-21 are screwed into threaded holes through the upper housing part 11, such that the end part of at least some of them (15-17) are visible in FIG. 1, from the upper side of the attachment part 10. The screw heads of the attachment part are accessed from the lower side (not shown) of the attachment part 10.

An attachment part for e.g. a power wrench is used in confined spaces where it may not be possible to use an ordinary power wrench, due to that it is difficult or impossible to access the bolt or nut to be screwed. Hence, the size of the attachment part is an important feature. The attachment part 10 according to the invention has a construction that allows it to be thinner than a conventional attachment part of the same accuracy and torque capacity. This will be apparent from the description below.

Figure 2:
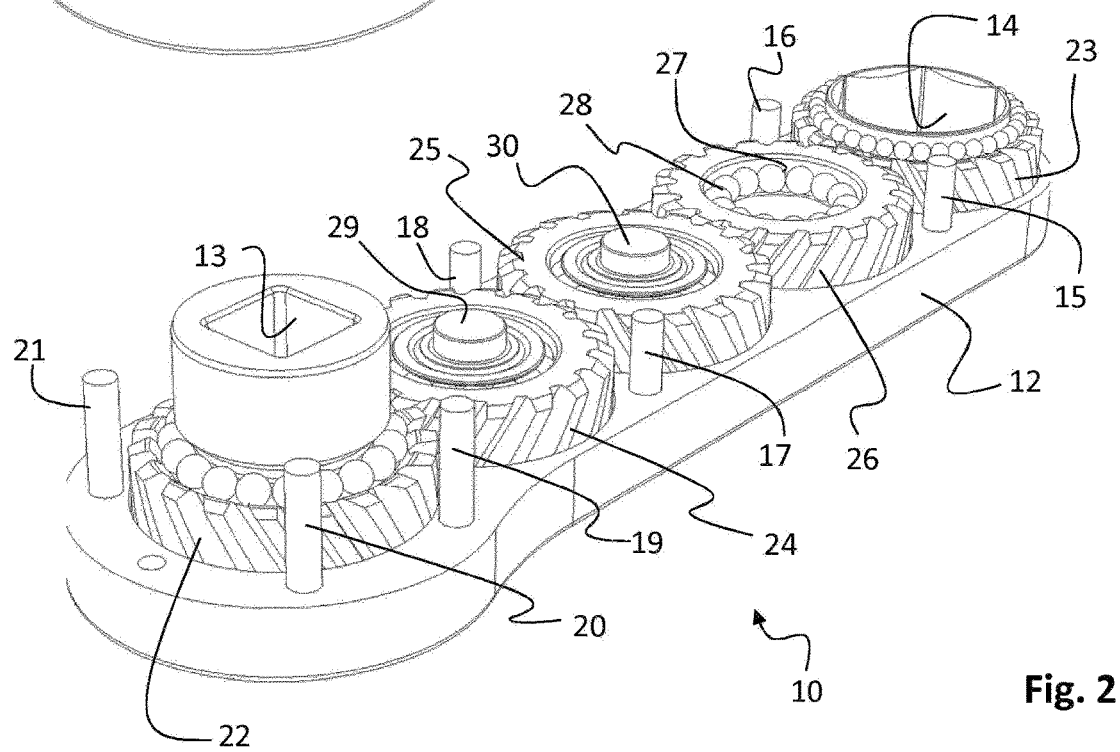
FIG. 2 shows the attachment part of FIG. 1 with the upper housing part removed.

In FIG. 2, the attachment part 10 is shown with the upper housing part 11 removed, such that the interior of the attachment part 10 is visible. From FIG. 2 it is apparent that the input connector 13 is rigidly connected to an input gear wheel 22, and that the output connector 14 is rigidly connected to an output gear wheel 23. In fact, in the shown specific embodiment, the input connector 13 is integral with the input gear wheel 22, and that the output connector 14 is integral with the output gear wheel 23, such that both gear wheels 22 and 23 are formed as individual integral pieces with teeth on the outside and a connector on the inside.

Figure 3:
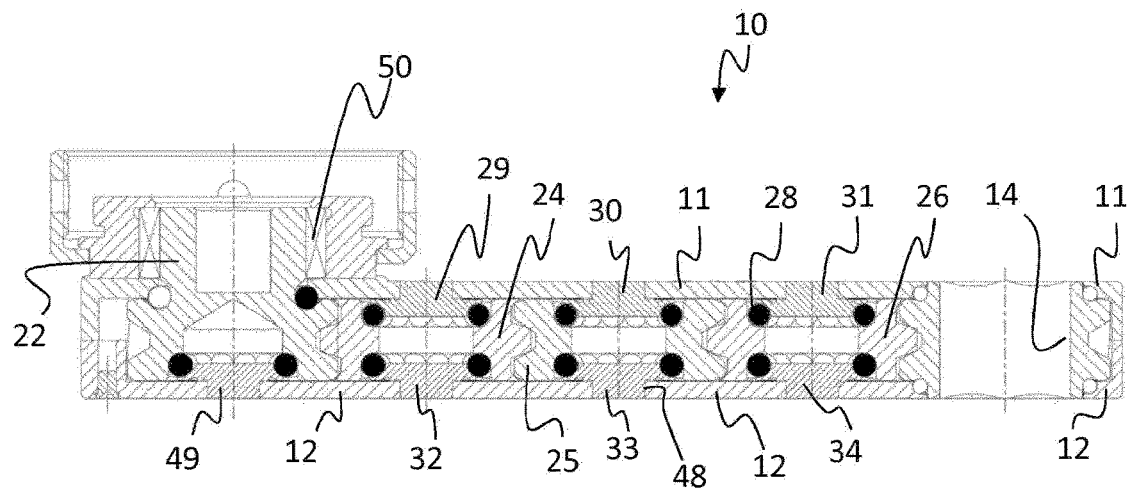
FIG. 3 shows a longitudinal section of an attachment part according to a specific embodiment of the invention.
Figure 7:
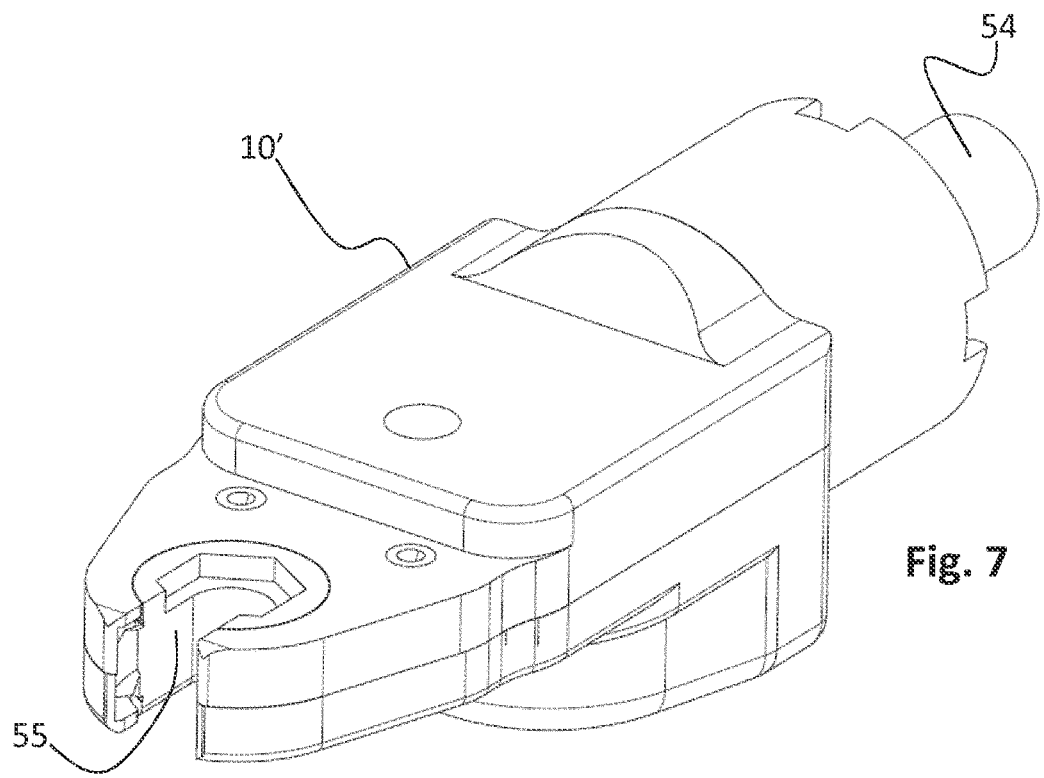
FIG. 7 shows a second embodiment of the attachment part according the invention.
Figure 8:
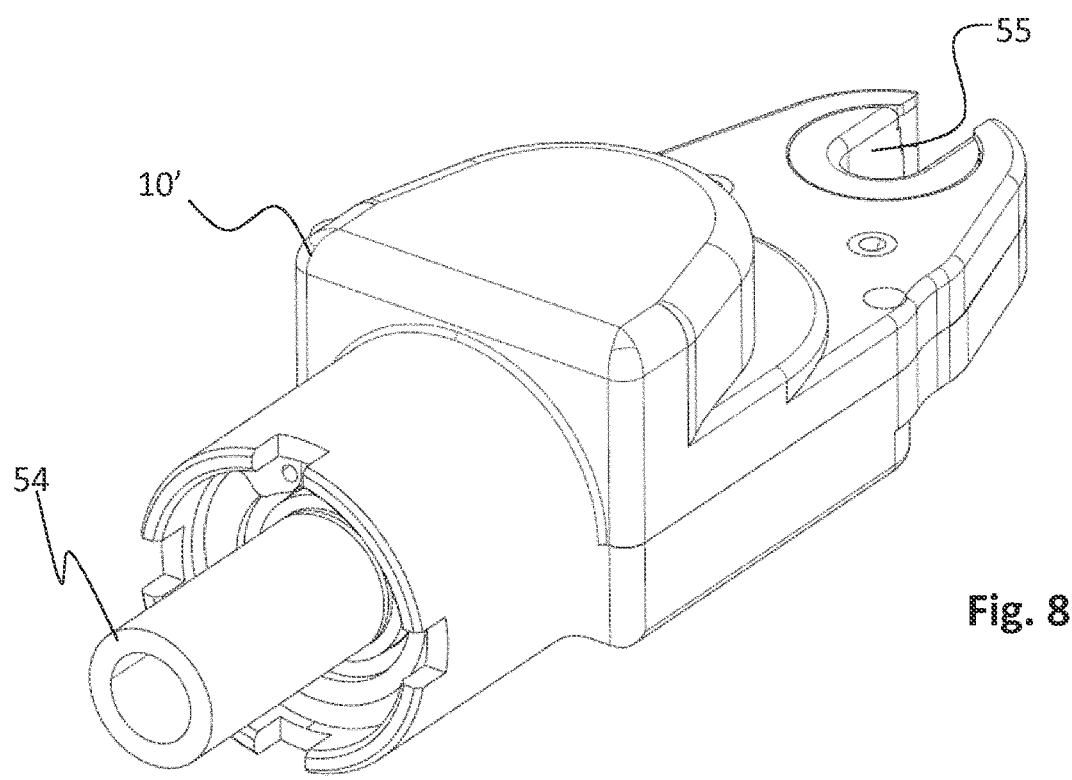
FIG. 8 shows the attachment part of FIG. 7 from the opposite direction.

The input connector 13 of the embodiment shown in FIGS. 1-3 includes a square interface to connect to an output end of a power wrench. In the attachment part 10' shown in FIGS. 7 and 8, the input gearing includes an angular gear wheel, such that the respective axes of the input shaft 54 and the gear wheels lie in different planes. The axe of the input shaft 54 is in the shown embodiment inclined 90° with respect to the gear wheels, but the angle of inclination may be adapted to any specific implementation of the attachment part. The construction of the input gearing is not relevant for this invention and is further well known to a person skilled in the art. Therefore, it will not be described in detail in this application. The invention covers both straight and inclined attachment parts. Further, the invention covers both attachment parts 10' with an open ended output 55 as the one shown in FIGS. 7-8, and attachment parts 10 with a closed output connector 14 as shown in FIGS. 1-3. The inventive construction is however specifically advantageous for attachment parts 10, both straight and inclined, with a closed output connector 14.

As is apparent in FIG. 2, the input gear wheel 22 is drivingly connected to the output gear wheel 23 via three intermediate gear wheels 24, 25, 26. Each gear wheel has outer slanted teeth that connect the input gear wheel 22 to the output gear wheel 23. Slanted teeth are advantageous because they increase the contact surfaces between the gear wheels 22-26, such that both the accuracy and the torque level of the attachment part 10 may be increased. However, the slanted teeth give rise to axial forces that will act on the gear wheels. This implies that the gear wheels need to be journalled in bearings that support them both axially and radially. Normally, axial supports build on the width of the attachment part. In the inventive arrangement, the gear wheels are however journalled in a manner that keeps the height of the attachment part 10 to a minimum.

The intermediate gear wheels, see specifically gear wheel 26, comprise an upper race 27 in which balls 28 are arranged. All intermediate gear wheels 24, 25, 26 comprise an upper race, but all races are not visible in FIG. 2 as they are covered by upper axial supports 29 and 30. As is apparent in FIG. 1, these upper axial supports 30 and 31 are clamped into through holes 48 that run through the upper housing part 11. The upper axial supports 29-31 are arranged to support the balls 28 that are arranged inside said upper race(s) 27.

As is visible in FIG. 3 an upper part of each intermediate gear wheel 24, 25, 26 is supported with respect to the housing 11, 12 by means of a corresponding upper axial support 29, 30, 31. Likewise, similar lower axial supports 32, 33, 34 are clamped into through holes 48 that are arranged through the lower housing part 12. Also, a similar axial support 49 is arranged to support the lower part of the input gear wheel 22. Other than that, the input gear wheel 22 is journalled in a conventional manner, e.g. by means of inter alia a radial bearing 50. For this first end of the attachment part 10, which is to be attached to the power wrench, the size is not crucial.

Figure 4:
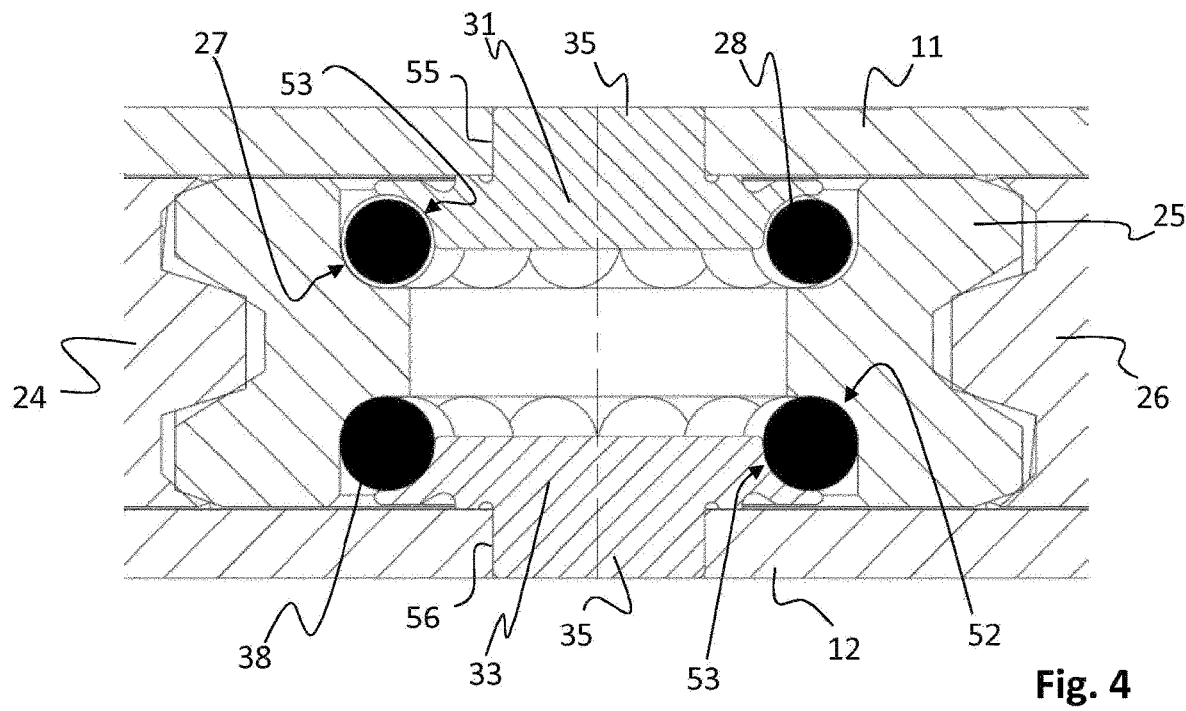
FIG. 4 shows a detailed view of a central portion of the attachment part shown in FIG. 3.

One of the intermediate gear wheels 25 is shown in detail in FIG. 4. As is visible in FIG. 3, this intermediate gear wheel 25 is arranged in between the two other intermediate gear wheels 24, 26. The intermediate gear wheel 25 is arranged with a close fit inside the housing. There is however a small gap between the axial faces of the intermediate gear wheels 25 and the housing walls 11, 12. This gap is useful to avoid frictional contact with the inside of the housing parts 11 and 12.

The intermediate gear wheels 24, 25, 26 are elastically journalled, such that there is an allowance, inside which the intermediate gear wheels 24, 25, 26 are allowed to be positioned. In the shown embodiment, the elasticity is inherent in the axial supports 29-34.

Figure 5:
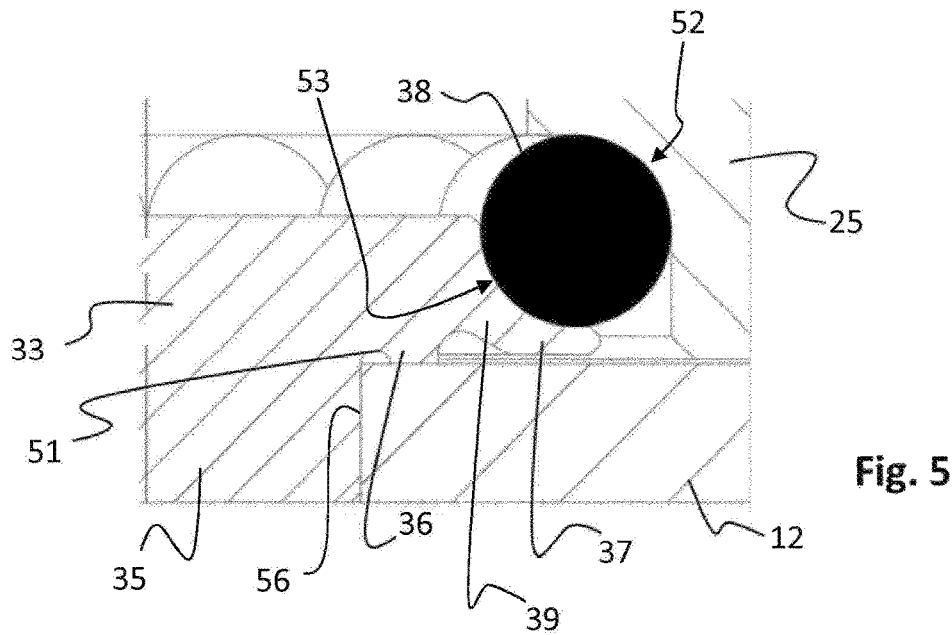
FIG. 5 shows a close up of the detailed view of the central portion shown in FIG. 4.

In FIG. 5, a lower axial support 33 is shown in detail. The lower axial support 33 includes a cylindrical body 35, which is clamped into a through hole 48 in the lower housing 12. Further, the lower axial support 33 includes an abutment portion 36 which is circular in the shown embodiment and adapted to be arranged in contact with the lower housing 12. The abutment portion 36 is separated from the cylindrical body 35 by a circular recess 51. The circular recess 51 is a result of the machining of the axial support and allows for a close fit between the abutment portion 36 and the inside wall of the housing. Radially outside of the abutment portion 36 a circular flange 37 is arranged. The circular flange 37 has a partly hollow portion 53 which functions as a race and is arranged to support the bearing balls 38. Further, the circular flange 37 is separated from the cylindrical body 35 by a flex portion 39 that allows the flange 37 to flex with respect to the cylindrical body 35 of the axial support 33, and hence with respect to the housing 11, 12.

An advantage of the bearing arrangement of the shown embodiment is that its construction has a high torsional strength. This is apparent from FIG. 4. To a skilled person, the bearing arrangement of FIG. 4 has an O-configuration as opposed to an X-configuration, such as the bearing arrangement shown in FIG. 6, around the output gear wheel 23.

The O-configuration around the intermediate gear wheel 25 in FIG. 4 is advantageous in that it is well adapted to receive the torsional efforts that may appear during operation. If, for example, the torsional forces induced by the interaction between the slanted gears acts on the intermediate gear wheel 25 so as to rotate it clockwise as it appears in FIG. 4, the upper left ball 28 will be pressed upwards and slightly to the right by the upper race 27 of the intermediate gear wheel 25. This force will be positively received by the hollow portion 53 of the upper axial support 30, which in turn is supported by the upper housing part 11. Similarly, the lower right ball 38 will be pressed downwards and slightly to the left by the lower race 52, which force will be positively received by the lower axial support 33, which in turn is supported by the lower housing part 12. The upper left bearing 28 and the lower left bearing will 38 experience only limited forces in this state. Of course, as the intermediate gear wheel 25 and the balls are rotating, it is not a specific ball that is put under pressure, it is the current location of each ball that is decisive for how much pressure is exerted on it, such that theoretically each ball experiences the same forces when located at one specific location.

When the attachment part is driven in the opposite direction, so as to loosen instead of tightening a bolt or vice versa, the intermediate gear wheel 25 will be rotated in the opposite direction and the forces will act in the opposite direction on the intermediate gear wheel 25 so as to act to rotate it counter clockwise as it appears in FIG. 4. Hence, in this state, the upper balls 28 will experience the highest forces at the position that corresponds to the upper right position in the figure, and the lower balls 38 will experience the highest forces at the position that corresponds to the lower left position in the figure.

Due to the inherent elasticity of the circular flanges 37 the intermediate gear wheels 24, 25, 26 will be allowed to be re-positioned to a certain degree with respect to the housing 11, 12. This will reduce the stress between the housing parts 11, 12 and the intermediate gear wheels 24, 25, 26, and thereby minimise the risk of ruptures due to fatigue.

In different applications it is preferable to use a various number of intermediate gear wheels. There has to be at least one intermediate gear wheel, and normally there are two or three intermediate gear wheels located between the input gear wheel and the output gear wheel.

Of course, there may be even more intermediate gear wheels for certain applications.

Figure 6:
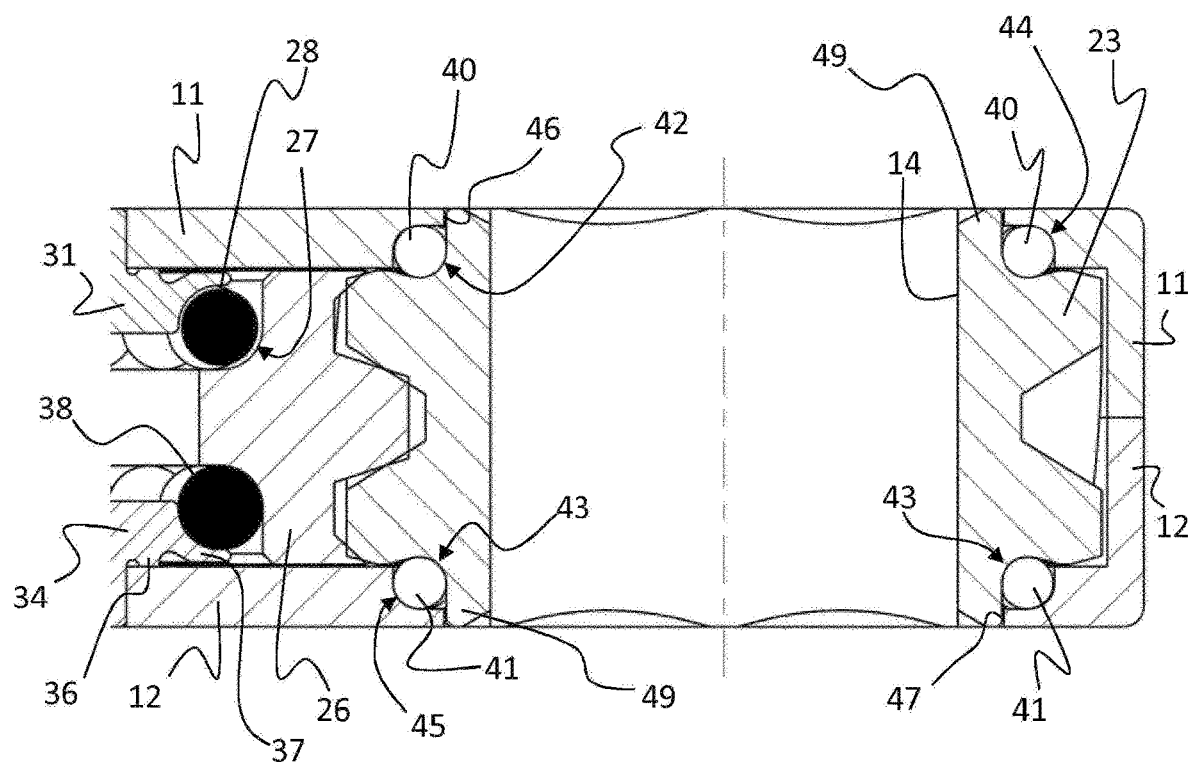
FIG. 6 shows a detailed view of an end portion of the attachment part shown in FIG. 3.

FIG. 6 shows a cross section of the second end of the attachment part 10. The second end involves an output connector 14 for connection to a joint to be tightened. In the shown embodiment the output connector 14 consists of a hexagonal socket, which is integral with the output gear wheel 23. The output gear wheel 23 is journalled with respect to the housing 11, 12 by means of balls 40, 41 that are arranged between outer races 42, 43 on the output gear wheel 23 and corresponding races 44, 45 on the inside of the housing 11, 12. Specifically, a first set of balls 40 are arranged in an upper outer race 42 on the upper periphery of the output gear wheel 23, and a second set of balls 41 are arranged in a lower outer race 43 on the lower periphery of the output gear wheel 23. Both the upper housing 11 and the lower housing 12 has a circular opening 46, 47, respectively, through which end parts 49 of the output gear wheel 23 extend. The housings 11 and 12 comprise races 44, 45 that cover the balls 40, 41. The races 44, 45 are formed as circular recesses in the portion of the housing 11, 12 adjacent the circular openings 46, 47. The end parts 49 of the output gear wheel 23 are arranged with a close fit inside these circular openings 46, 47 of the housing 11, 12.

Figure 9:
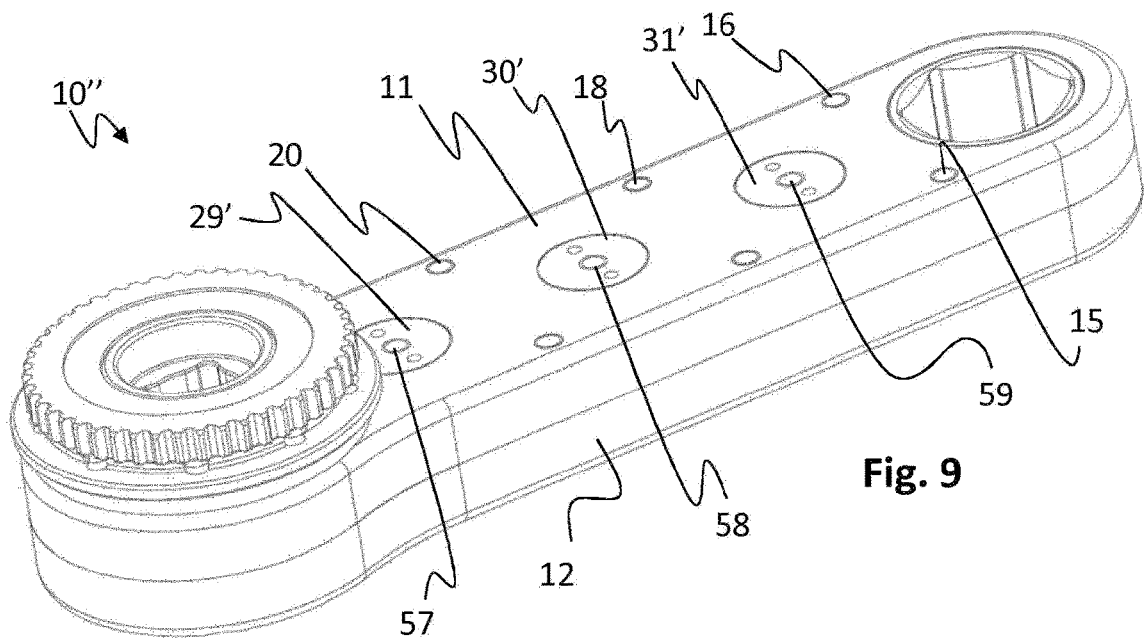
FIG. 9 is a top view of an attachment part according to a third embodiment of the invention.
Figure 10:
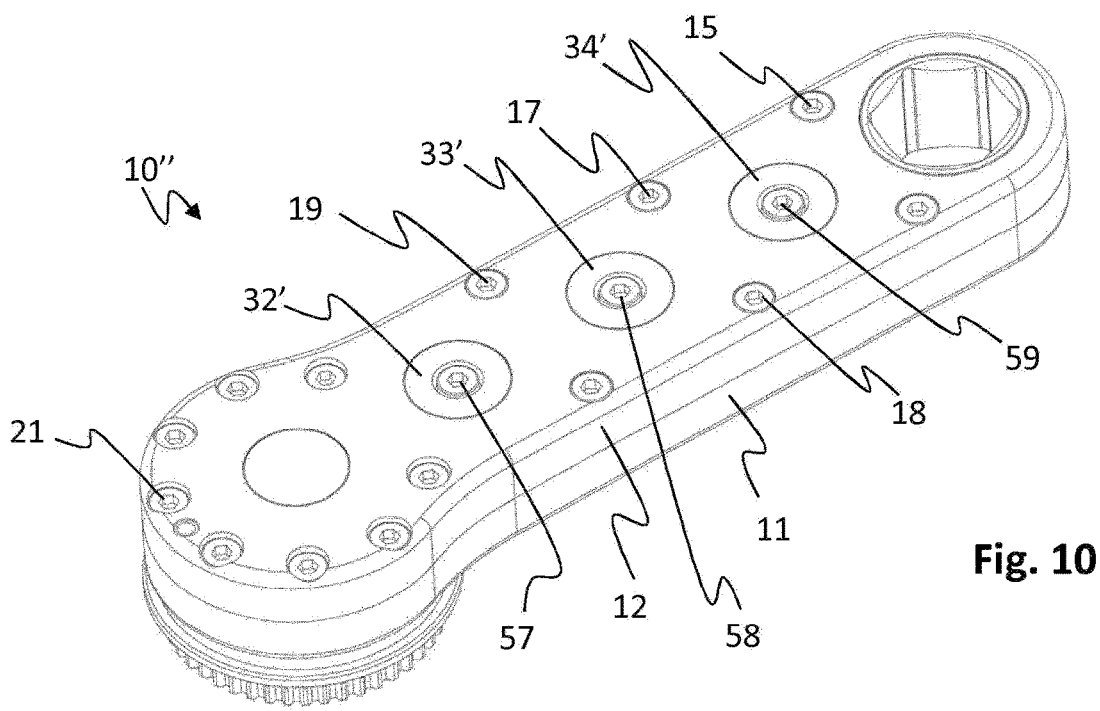
FIG. 10 is a view from below of an attachment part according to the third embodiment of the invention.

In FIGS. 9-12 a third embodiment of an attachment part 10″ according to the invention is shown. This third embodiment resembles the attachment part according to the first and second embodiment in that it comprises an upper and a lower housing part 11 and 12, respectively. The housing parts 11, 12 are attached to each other by means of screws 15-21. This is shown in FIGS. 9-10. Further, attachment pieces 57-59 are arranged through a centre line of the attachment part 10″. The attachment pieces 57-59 are arranged to clamp axial supports 29′,30′,31′ of the upper housing part 11 to axial supports 32′,33′,34′ of the lower housing part 12.

Figure 11:
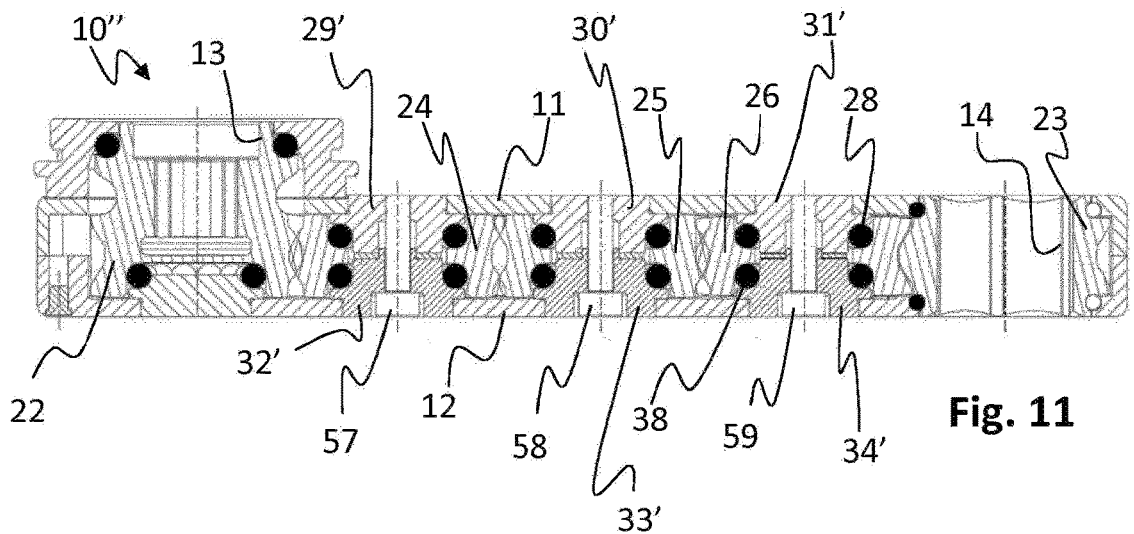
FIG. 11 is a sectional view of the attachment part according to the third embodiment.
Figure 12:
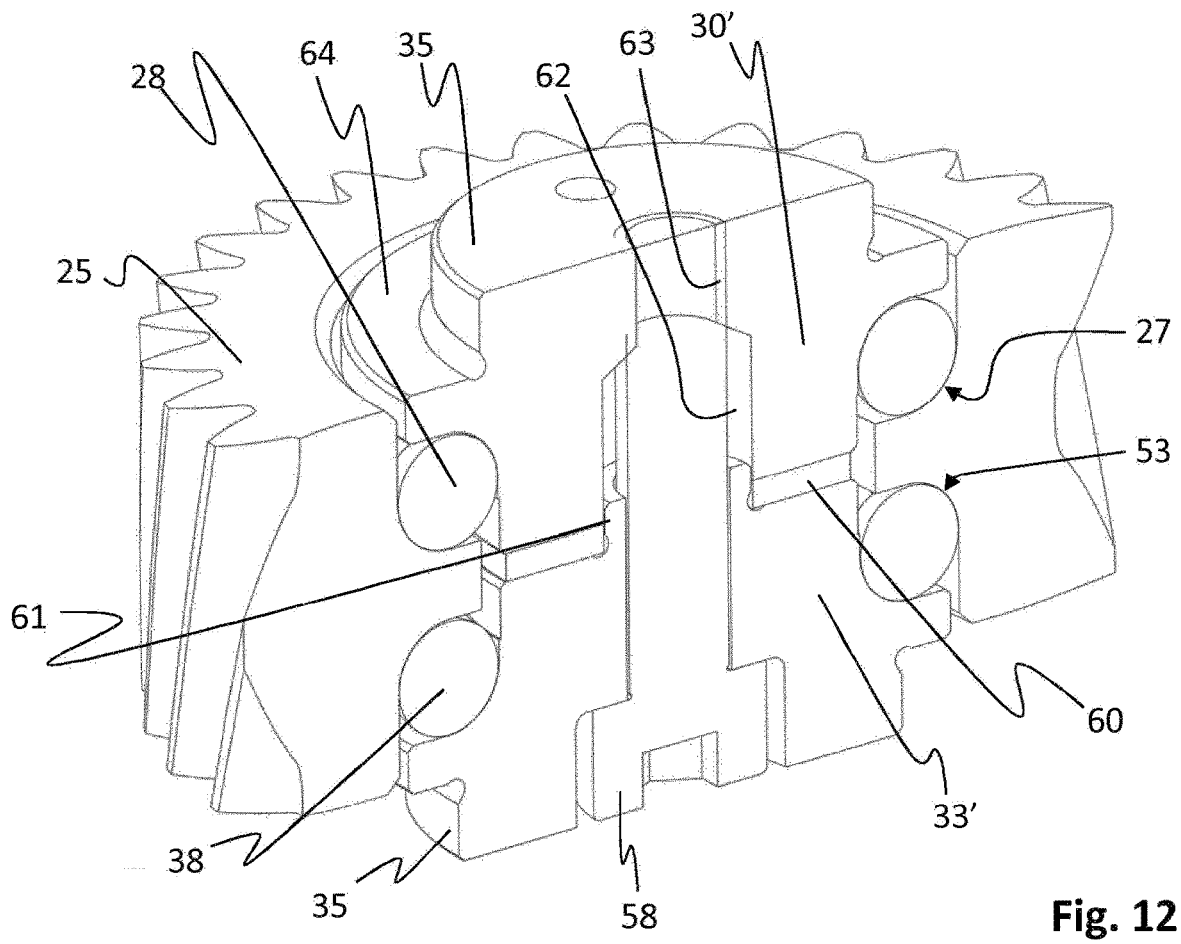
FIG. 12 is a perspective cut view of a gear package of an attachment part according to the third embodiment of the invention.

As is apparent in FIGS. 11 and 12 the balls 28 in the upper race 27 of the intermediate gear wheels 24-26 are fully supported by an upper axial support 29′,30′,31′. The balls 28 in the lower race 53 are fully supported by a lower axial support 32',33',34'. The lower and upper axial supports 29'-34' are connected to each other via an attachment piece 57-59 that runs through the centre of the intermediate gear wheel 24,25,26, such that an upper axial support 29'-31', a set of upper balls 28, a gear wheel 24,25,26, a set of lower balls 38, and a lower axial support 32',33',34' forms a releasable gear package. This is advantageous in that part of the axial forces will be taken up in the gear package, i.e. by the attachment piece 57-59, such that the efforts on the housing 11 and 12 will be less important.

In the shown embodiment the attachment pieces 57-59 are screws and the upper axial supports 29',30',31' have a threaded portion 63 inside which the tip of the attachment pieces 57-59 is to be screwed. See FIG. 12.

From FIG. 12 it is also apparent that the upper and lower axial supports 30',33' include a body portion 35 that is arranged to be received in through holes in the upper and lower housing part 11,12, respectively. The lower axial support 33' comprises a protrusion 61 that is arranged to fit tightly inside a recessed portion 62 of the upper axial support 30'. The protrusion 61 is arranged along the centre of the lower axial support 33' adjacent the through hole for the attachment piece 58. The interaction between the protrusion 61 of the lower axial support 33' and the recessed portion 62 of the upper axial support 30' will, in combination with the clamp force of the attachment piece 58, make sure that the upper and lower axial supports 30',33' are fixed with respect to each other. One or more shin(s) 60 may be arranged between the upper and lower axial supports 30',33' in order to achieve a correct distance between the supports 30',33'. It is however also possible to produce the axial supports with such a precision that no shins will be needed.

The upper and lower axial supports 30',33' include a support ring 64 arranged to support the balls 28,38 at one end and to abut the housing 11,12 at the other end.

Above, the invention has been described with reference to two specific embodiments. The invention is however not limited to either of these embodiments. It is obvious to a person skilled in the art that the invention may be modified within its scope, which is defined by the following claims.

The invention claimed is:

1. An attachment part for tightening joints, comprising:
   an elongate housing including an upper housing part and an interconnected lower housing part, and
   a plurality of gear wheels, the plurality of gear wheels comprising:
      an input gear wheel for connection to an output shaft of a power wrench, the input gear wheel being arranged at a first end of the housing,
      an output gear wheel for connection to a joint to be tightened, the output gear wheel being arranged at a second end of the housing, and
      at least one journalled intermediate gear wheel which is arranged inside the housing to transmit rotation of the input gear wheel to the output gear wheel,
   wherein each of the plurality of gear wheels has outer slanted teeth that connect with the outer slanted teeth of at least one other one of the plurality of gear wheels and transmit rotation therebetween,
   wherein the at least one journalled intermediate gear wheel comprises:
      an upper race which is arranged inside the at least one journalled intermediate gear wheel and which faces the upper housing part, wherein a first plurality of balls are arranged in said upper race at least partly inside the at least one journalled intermediate gear wheel to support an upper part thereof with respect to the housing, and
      a lower race which is arranged inside the at least one journalled intermediate gear wheel and which faces the lower housing part, the lower race being distinct from the upper race, wherein a second plurality of balls are arranged in said lower race at least partly inside the at least one journalled intermediate gear wheel to support a lower part thereof with respect to the housing, the second plurality of balls being separate from the first plurality of balls,
   wherein the first plurality of balls in the upper race are supported by an upper axial support, and the second plurality of balls in the lower race are supported by a lower axial support, the upper and lower axial supports being connected to each other via an attachment piece that runs through a center of the at least one journalled intermediate gear wheel such that the upper and lower axial supports, the first and second pluralities of balls, and the at least one journalled intermediate gear wheel form a releasable gear package, and
   wherein each of the upper axial support and the lower axial support includes a body portion, the body portion of the upper axial support being received in and opposing an inner peripheral surface of a through hole formed through the upper housing part, and the body portion of the lower axial support being received in and opposing an inner peripheral surface of a through hole formed through the lower housing part.

2. The attachment part according to claim 1, wherein the upper and lower races are arranged at a position inside the at least one journalled intermediate gear wheel that allows the entirety of the balls to fit inside the at least one journalled intermediate gear wheel.

3. The attachment part according to claim 1, wherein the attachment piece comprises a screw and wherein one of the axial supports has a threaded opening inside which a tip of the screw is to be screwed.

4. The attachment part according to claim 1, wherein the output gear wheel is journalled inside the housing with balls that are arranged between an upper and lower outer periphery of the output gear wheel and the respective housing part.

5. The attachment part according to claim 1, wherein the at least one journalled intermediate gear wheel comprises at least two journalled intermediate gear wheels.

6. The attachment part according to claim 5, wherein the at least one journalled intermediate gear wheel comprises three journalled intermediate gear wheels.

7. The attachment part according to claim 1, wherein the upper housing part and the lower housing part are held together by screws outside the at least one journalled intermediate gear wheel, and
   wherein there is a gap between each of the screws and one of the upper housing part and the lower housing part, and the screws are engaged with threaded holes provided in the other of the upper housing part and the lower housing part.

8. The attachment part according to claim 1, wherein the first plurality of balls in the upper race and the second plurality of balls in the lower race are separated from each other by an interior portion of the at least one journaled intermediate gear.

* * * * *